Figure 1:
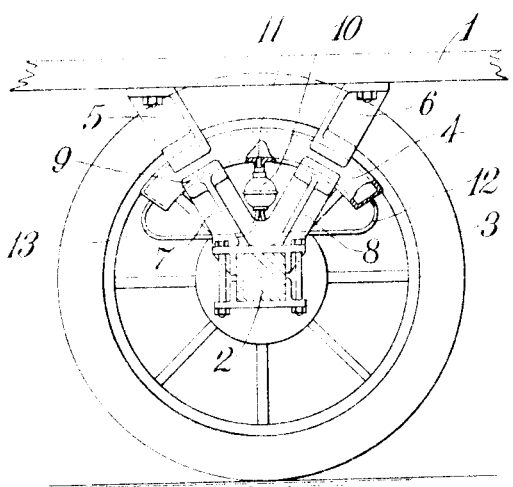

J. H. CLUNE.
CUSHIONING DEVICE FOR VEHICLES.
APPLICATION FILED AUG. 30, 1913.

1,106,496.  Patented Aug. 11, 1914.

Witnesses:

Inventor:
John H. Clune.
By Chapin & Co.
Attorney.

UNITED STATES PATENT OFFICE.

JOHN H. CLUNE, OF SPRINGFIELD, MASSACHUSETTS.

CUSHIONING DEVICE FOR VEHICLES.

1,106,496.        Specification of Letters Patent.     Patented Aug. 11, 1914.

Application filed August 30, 1913. Serial No. 787,472.

*To all whom it may concern:*

Be it known that I, JOHN H. CLUNE, a citizen of the United States, residing at Springfield, in the county of Hampden and State of Massachusetts, have invented new and useful Improvements in Cushioning Devices for Vehicles, of which the following is a specification.

This invention relates to improvements in road vehicles and particularly to cushioning devices for automobiles. The invention is designed for the purpose of lessening the shock between the road-bed and the vehicle body.

Heretofore, in this class of vehicles, the usual spring devices consist generally of springs either elliptical or half elliptical. In practice, the ordinary spring construction is found to be defective in that it does not effectually absorb all of the vibrations incident to travel.

The present invention comprises in general a pneumatic cushioning device with yieldable walls that is located between the car body and the axle. It is well-known that the elastic properties of air are very sensitive to slight variations in pressure as this is demonstrated on the ordinary pneumatic tire in comparison with the solid or cushion tires. By combining a pneumatic cushion with the pneumatic tires, a very effective cushioning device for automobiles is produced.

The invention further comprises means to permit the air to readily flow from one end of the cushioning device to the other during the travel of the vehicle, and this is broadly accomplished by providing a relief chamber with connections having different sizes and which extend therefrom to the cushioning device.

Referring to the drawings:—

Figure 2:
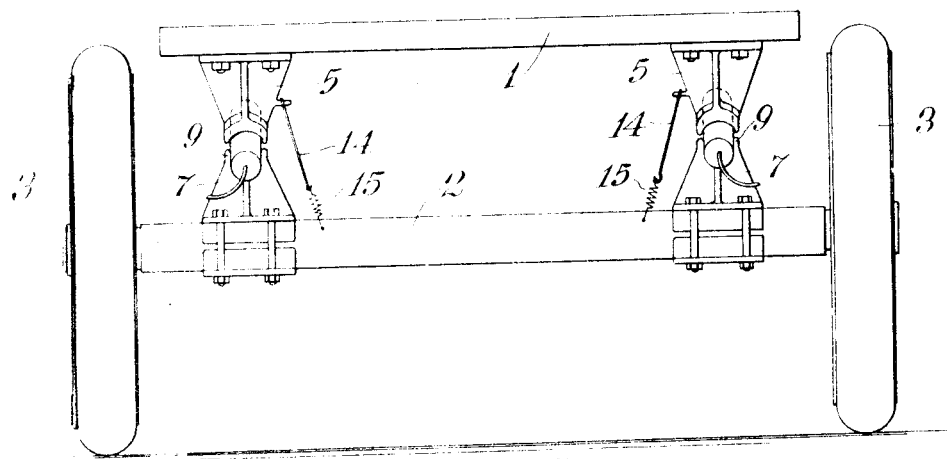

Figure 1 is an end elevation of a portion of the vehicle body and showing one of the wheels in outline, also illustrating the pneumatic cushioning device between the body and the axle. Fig. 2 is an end elevational view showing two of the cushioning devices and the manner of their attachment to the vehicle body and the axle, also means to automatically retain the device in place.

Referring to the drawings in detail, 1 designates in general, the car body and 2 the axle thereof. The supporting wheels are conventially indicated at 3.

4 indicates the cushioning device preferably composed of some elastic material, as rubberized cloth. The device as shown is arc-shaped. In order to retain this device in place, a pair of downwardly extending brackets 5 and 6 is attached to the underside of the car body, and extending at an angle thereto. Their lower ends are formed with curved seat portions, the curvature of which corresponds with the outside curvature of the cushioning device. Attached to the axle is a pair of upwardly extending brackets 7 and 8, in the direction of the brackets 5 and 6, their upper ends being formed with curved seat-portions 9 in which rests the cushioning device 4. The inner ends of the brackets 5, 6, 7, and 8 are spaced from each other a suitable distance, whereby when the cushioning device is compressed, they will not directly engage each other.

10 designates an equalizing chamber having a communication indicated at 11, with the middle portion of the cushioning device 4. The opposite end of this equalizing chamber is connected by means of the tubes 12 and 13 with the opposite ends of the cushioning device 4, as shown, and it should be stated that the size of the opening through the tubes 12 and 13 is very much smaller than the opening indicated in the connection 11. The purpose of making these connections 11, 12, and 13 of different sizes is to permit the air to gradually flow from one end of the cushioning device 4 through the equalizing chamber 10 to the central portion of the cushioning device or, in other words, to obtain a wire drawing effect of the air when pressure is imparted to cushioning device. This construction permits the air to gradually flow from either end of the cushioning device to the central portion in order to gradually compensate for any sudden jolts or pressure that may be exerted by the vehicle or axle on the cushion device 4. Should a sudden jolt or shock be transmitted from the axle 2 to the brackets 7 or 8, the device 4 will be suddenly compressed, and the air adjacent the bearing portions 9 will suddenly compress the air in the cushioning device and cause it to flow through either one of the pipes 12 and 13 to the equalizing chamber 10 and from there through the enlarged opening 11 to the central portion thereof.

In order to retain the brackets 5, 6, 7, and 8 in their normal position, and, also to retain the body portion 1 in its normal relation with the axle 2, a connection 14 extends from the upper pair of brackets to the axle. A spring 15 is preferably interposed in this connection to permit the brackets to readily follow any up and down motion as well as any lateral motion of the axle.

Referring to Fig. 1, it will be noticed that the brackets 5, 6, 7, and 8 will permit the vehicle body 1 to have fore and aft motion on the cushioning device 4 by reason of the curved shape of the portions 7 and 9.

What I claim is:—

1. In a cushioning device for vehicles, the combination with the body portion thereof, of a pneumatic member located between said body and the axle of the vehicle, retaining means for the member comprising brackets having their inner ends spaced from each other to receive the pneumatic member, an equalizing chamber having communication with the central and end portions of the pneumatic member, whereby, when a sudden pressure, is communicated to the pneumatic device, a flow of air will take place between the ends and the central portion thereof, as described.

2. In a cushioning device for road vehicles the combination, a flexible pneumatic member located between the body and the axle of the vehicle, means to support said member to permit the body to move fore and aft, an equalizing chamber, means to connect the opposite ends of the pneumatic member with one side of the equalizing chamber, means to connect the opposite side of the equalizing chamber with the central portion of the pneumatic member, the area of the first communication being smaller than the area of the second described communicating means, whereby, when a sudden pressure is imparted to the flexible pneumatic member the air in said member will gradually flow to the equalizing chamber and from there back into the pneumatic member in order to restore the equilibrium of the air in said member, as described.

JOHN H. CLUNE.

Witnesses:
EDITH M. POTTER,
CAROLINE W. WILLIS.